United States Patent
Kopikare et al.

(10) Patent No.: US 8,917,645 B2
(45) Date of Patent: Dec. 23, 2014

(54) POWER SAVE MODE FOR ACCESS POINTS

(71) Applicant: Marvell World Trade Ltd., St. Michael (BB)

(72) Inventors: Milind Kopikare, Cupertino, CA (US); Raja Banerjea, Sunnyvale, CA (US); Paul A. Lambert, Mountain View, CA (US); Robert Fanfelle, Redwood City, CA (US)

(73) Assignee: Marvell World Trade Ltd., St. Michael (BB)

( * ) Notice: Subject to any disclaimer, the term of this patent is extended or adjusted under 35 U.S.C. 154(b) by 0 days.

(21) Appl. No.: 14/032,610

(22) Filed: Sep. 20, 2013

(65) Prior Publication Data

US 2014/0022973 A1 Jan. 23, 2014

Related U.S. Application Data (63) Continuation of application No. 12/499,361, filed on Jul. 8, 2009, now abandoned.

(60) Provisional application No. 61/080,133, filed on Jul. 11, 2008.

(51) Int. Cl.
*G08C 17/00* (2006.01)
*H04W 52/02* (2009.01)

(52) U.S. Cl.
CPC ............ *H04W 52/0206* (2013.01); *Y02B 60/50* (2013.01); *H04W 52/0241* (2013.01)
USPC ............................ 370/311; 370/400; 709/209

(58) Field of Classification Search
USPC ........... 370/311, 400; 709/203, 209; 455/572, 455/574, 127.1, 127.5
See application file for complete search history.

(56) References Cited

U.S. PATENT DOCUMENTS 5,570,369 A 10/1996 Jokinen
5,745,860 A 4/1998 Kallin
(Continued)

FOREIGN PATENT DOCUMENTS

EP 1318687 A2 6/2003
JP 2001-155788 A 6/2001
(Continued)

OTHER PUBLICATIONS

"Privacy-Preserving 802.11 Access Point Discovery"; Janne Lindqvist et al.; Mar. 16-18, 2009; Zurich, Switzerland; 8 pages.

(Continued)

*Primary Examiner* — Alvin Zhu (57) ABSTRACT

A first network device including a control module to operate the first network device, prior to beginning discovery of a second network device, initially in a power save mode and subsequently in a normal mode after receiving an input from a user of the first network device while operating in the power save mode; and prior to beginning the discovery and subsequent to the first network device switching from operating in the power save mode to the normal mode, to alternately operate the first network device as a client station and an access point. A device detection module begins, subsequent to the first network device switching from operating in the power save mode to the normal mode, the discovery by scanning a network or by transmitting a beacon over the network when the first network device operates as a client station or an the access point, respectively.

14 Claims, 9 Drawing Sheets

(56) References Cited

U.S. PATENT DOCUMENTS

| | | |
|---|---|---|
| 5,987,338 A | 11/1999 | Gibbons et al. |
| 7,298,716 B2 | 11/2007 | Abraham et al. |
| 2002/0024535 A1 | 2/2002 | Ueno et al. |
| 2007/0242645 A1 | 10/2007 | Stephenson et al. |
| 2008/0031199 A1 | 2/2008 | Park et al. |
| 2008/0095091 A1 | 4/2008 | Surineni et al. |
| 2008/0175187 A1 | 7/2008 | Lowry et al. |
| 2009/0034443 A1 | 2/2009 | Walker et al. |
| 2009/0054096 A1 | 2/2009 | Single |
| 2012/0155439 A1 | 6/2012 | Mariner et al. |
| 2012/0188927 A1* | 7/2012 | Bennett .................. 370/311 |
| 2013/0021959 A1* | 1/2013 | Bennet .................. 370/311 |
| 2013/0286914 A1* | 10/2013 | Palm et al. .................. 370/311 |

FOREIGN PATENT DOCUMENTS

| | | |
|---|---|---|
| JP | 2003-348104 A | 12/2003 |
| JP | 2004-336401 A | 11/2004 |
| JP | 2005-086425 A | 3/2005 |
| JP | 2007-202134 A | 8/2007 |
| JP | 2008-506335 A | 2/2008 |
| JP | 2009-510835 A | 3/2009 |
| WO | WO-2004/075583 A1 | 9/2004 |
| WO | WO-2005011183 A2 | 2/2005 |
| WO | WO-2006/033443 A1 | 3/2006 |
| WO | WO-2007035447 A2 | 3/2007 |
| WO | WO-2008021077 A2 | 2/2008 |

OTHER PUBLICATIONS

"Wi-Fi Proteted Setup Specification"; Version 1.0h; Wi-Fi AllianceTM; Dec. 2006; 110 Pages.

Fashandi, S. "Real-Time Handoff in Solar/Battery Powered ESS Mesh Networks." Personal, Indoor and Mobile Radio Communications 3 (Sep. 11, 2005) pp. 1489-1494.

Kohvakka et al. "PC/104 Based Wireless Diagnosis Module" IECON-2002. Proceedings of the 28th Annual Conference of the IEEE Industrial Electronics Society. Sevilla, Spain, Nov. 5-8, 2002; vol. 3, Nov. 5, 2002; pp. 2351-2356.

Sangkyu, Baek. "Performance Analysis of Power Save Mode in IEEE 802.11 Infrastructure WLAN." Telecommunications (Jun. 16, 2008) pp. 1-4.

Summary of Decision of Rejection for related Japanese Application No. 2011-517604; Ryuka Law Firm; Jun. 11, 2013; 3 Pages.

Summary of Decision of Rejection for related Japanese Application No. 2011-517609; Ryuka Law Firm; Jan. 29, 2013; 1 page.

Summary of Notice of Reasons for Rejection for related Japanese Application No. 2011-517604; Ryuka Law Firm; Nov. 6, 2012; 2 Pages.

Summary of Notice of Reasons for Rejection for related Japanese Application No. 2011-517609; Ryuka Law Firm; Oct. 30, 2012; 2 Pages.

The International Search Report and Written Opinion of the International Search Authority, or the Declaration mailed Oct. 28, 2009 for International Application No. PCT/US2009/050068 filed Jul. 9, 2009; 16 Pages.

The International Search Report and Written Opinion of the International Search Authority, or the Declaration mailed Nov. 4, 2009 for International Application No. PCT/US2009/050058 filed Sep. 7, 2009; 15 Pages.

Wi-Fi Certified TM for Wi-Fi Protected Setup TM; Easing the User Experience for Home and Small Office Wi-Fi Networks; 2007, 2008, 2009, Wi-Fi Alliance; 14 Pages.

* cited by examiner

POWER SAVE MODE FOR ACCESS POINTS

CROSS-REFERENCE TO RELATED APPLICATIONS

This is a continuation of U.S. patent application Ser. No. 12/499,361, filed on Jul. 8, 2009, which claims the benefit of U.S. Provisional Application No. 61/080,133, filed on Jul. 11, 2008. The entire disclosures of the above applications are incorporated herein by reference.

This application is related to U.S. Provisional Application No. 61/080,138, filed on Jul. 11, 2008. The entire disclosure of the above application is incorporated herein by reference.

FIELD

The present disclosure relates to providing a power save mode for access points.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Figure 1:
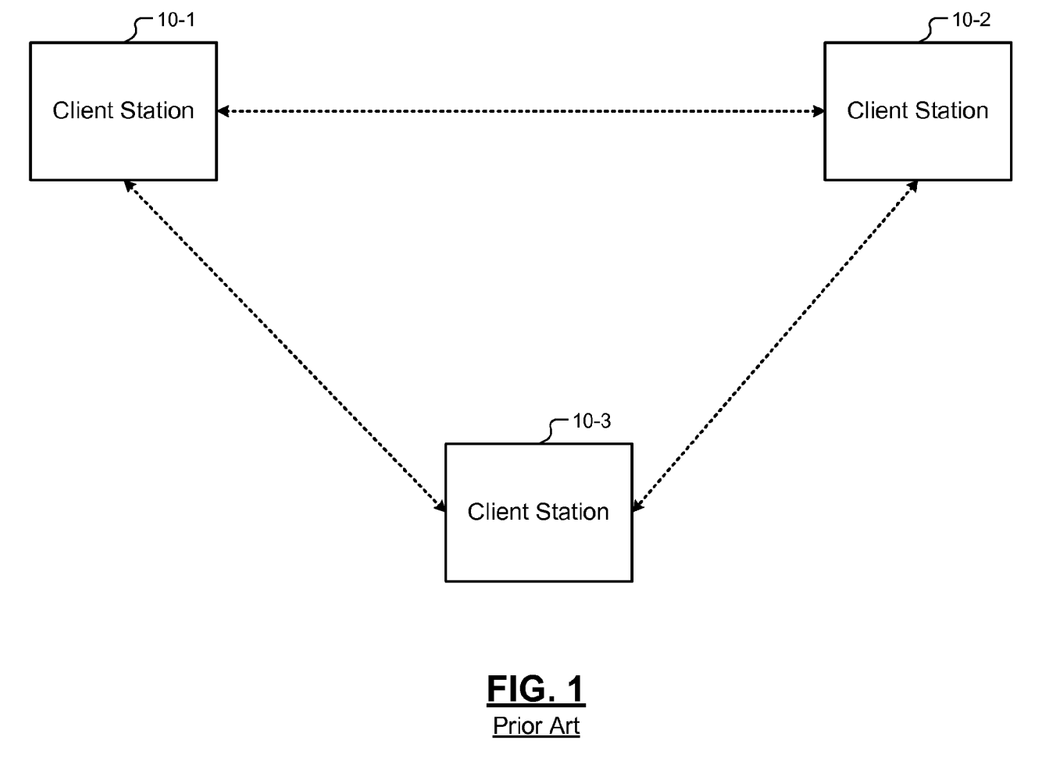
FIG. 1 is a functional block diagram of an exemplary network in ad-hoc mode according to the prior art.
Figure 2:
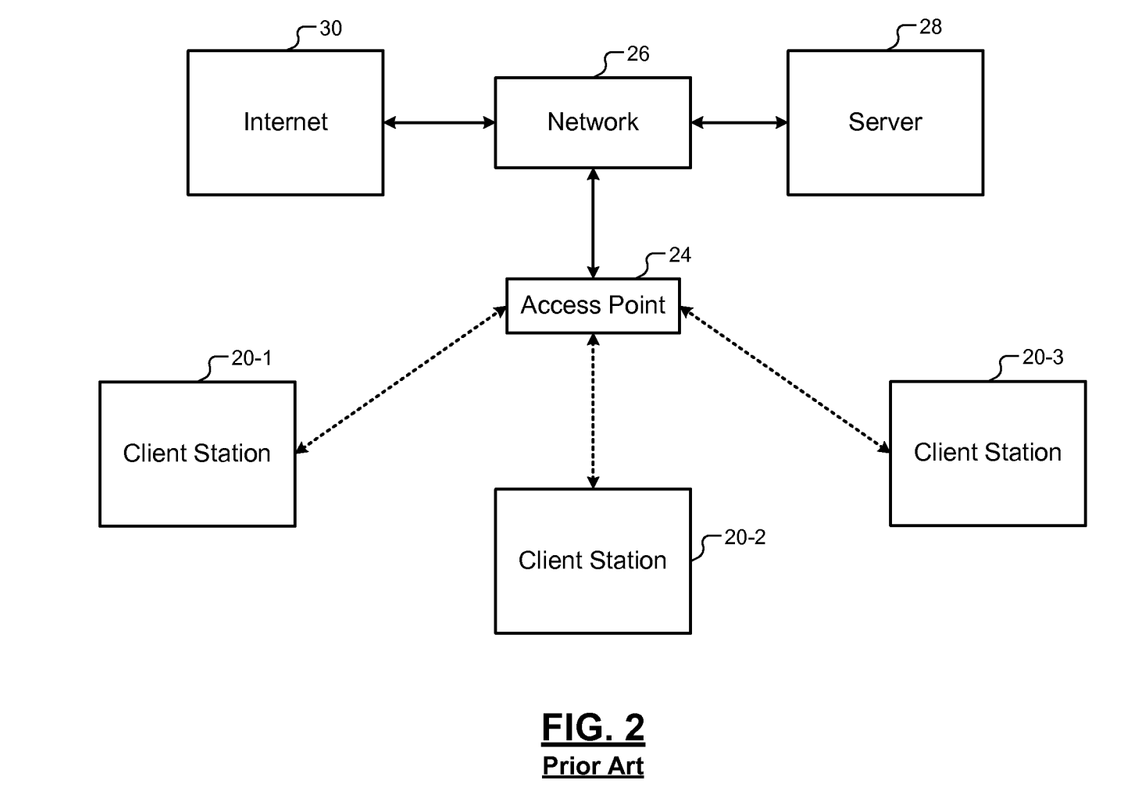
FIG. 2 is a functional block diagram of an exemplary network in infrastructure mode according to the prior art.

Referring now to FIGS. 1 and 2, local area networks (LANs) typically operate in an ad-hoc mode or an infrastructure mode. In FIG. 1, an exemplary LAN operating in the ad-hoc mode is shown. In the ad-hoc mode, each one of the client stations 10-1, 10-2, and 10-3 (collectively client stations 10) communicates directly with other client stations 10 without using an access point (AP). In FIG. 2, an exemplary LAN operating in the infrastructure mode is shown. In the infrastructure mode, each one of the client stations 20-1, 20-2, and 20-3 (collectively client stations 20) communicates with other client stations 20 through an AP 24. Additionally, the AP 24 may connect the client stations 20 to a network 26, a server 28, and to the Internet 30.

Figure 3:
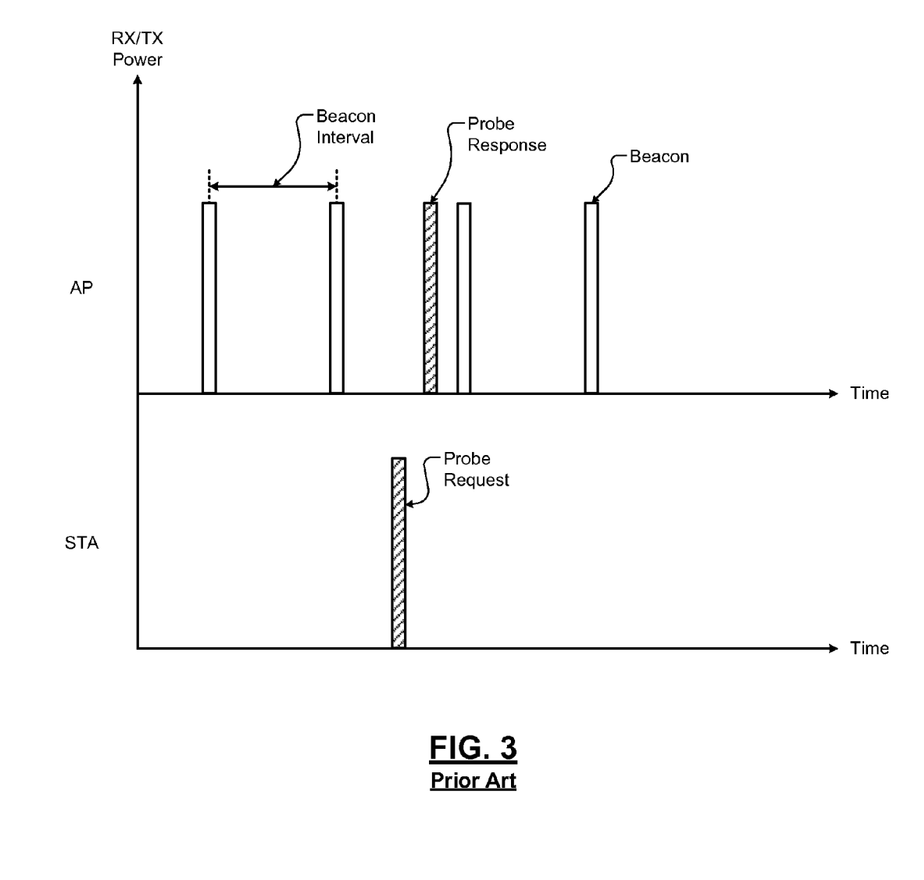
FIG. 3 shows exemplary signals communicated by an access point (AP) and a client station according to the prior art.

Referring now to FIG. 3, the AP 24 transmits beacons to the client stations 20 at a predetermined time interval called a beacon interval. Additionally, the AP 24 transmits a probe response to a client station 20 when the AP 24 receives a probe request from the client station 20.

Based on the beacon interval, each client stations 20 can determine a corresponding duration of time to sleep or operate in a power save mode before waking up to communicate with the AP 24. Thus, the client stations 20 can save power by periodically sleeping or operating in the power save mode. The AP 24 stays powered on to transmit beacons at the beacon interval and to transmit probe responses when probe requests are received from the client stations 20.

SUMMARY

An access point comprises a detection module and a control module. The detection module determines whether a client station communicates with the access point during a predetermined period of time. The access point initially operates in a normal mode during the predetermined period of time. The control module transitions the access point from the normal mode to a power save mode based on whether the client station communicates with the access point during the predetermined period of time.

In another feature, the control module turns off power supply to at least portions of the access point in response to control module transitioning the access point to the power save mode.

In another feature, the access point further comprises an input sensing module to sense an input from a user of the client station. The control module transitions the access point from the power save mode to the normal mode based on the input.

In another feature, the input sensing module includes a pushbutton to configure the access point and the client station to operate in a secure network.

In another feature, the access point further comprises a power supply to supply power to the access point. The control module controls the power supplied by the power supply to the access point during the normal mode and the power save mode.

In another feature, the access point further comprises a power supply that supplies a normal power to the access point when the access point operates in the normal mode. The power supply supplies no power or less than the normal power to the access point when the access point is in the power save mode. The power supply supplies no power or less than the normal power to portions of the access point when the access point is in the power save mode.

In another feature, the detection module determines whether the client station communicates with the access point based on whether the detection module receives at least a probe request transmitted by the client station to the access point.

In another feature, the control module does not transition the access point to the power save mode when at least one client station communicates with the access point during the predetermined period of time.

In another feature, the access point transmits beacons and probe responses when the access point operates in the normal mode. The access point does not transmit the beacons and the probe responses when the access point is in the power save mode.

In another feature, the client station communicates with the access point via a secure network. A user of the client station configures security features of the secure network using at least one of a first pushbutton on the access point and a second pushbutton on the client station.

In still other features, the apparatus described above is implemented by a computer program executed by one or more processors. The computer program can reside on a computer readable medium such as but not limited to memory, nonvolatile data storage, and/or other suitable tangible storage mediums.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein.

DESCRIPTION

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical OR. It should be understood that steps within a method may be executed in different order without altering the principles of the present disclosure.

As used herein, the term module may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Many mobile network devices can implement access points (APs). In general, mobile network devices are typically powered by batteries. Minimizing power consumption of mobile network devices can increase a length of time that the batteries can supply power to the mobile network devices prior to being recharged. Specifically, when the mobile network devices implement APs, the power consumption of the mobile network devices can be reduced by providing a power save mode for the APs.

More specifically, an AP may be operated in a normal mode or the power save mode depending on whether a client station (STA) is associated with the AP. In the normal mode, the AP performs normal operations including transmitting beacons, receiving probe requests, and transmitting probe responses. In the power save mode, the AP goes to sleep and does not perform the normal operations, thereby saving power.

The AP may be transitioned from the power save mode to the normal mode by a user of a STA when the user intends to associate the STA with the AP. For example, the user of the STA may push a pushbutton on the AP to wake up the AP (i.e., to transition the AP from the power save mode to the normal mode). Thereafter, the AP operates in the normal mode and performs the normal operations. The AP transmits beacons to client stations and responds to probe requests received from the client stations.

The AP transitions from the normal mode to the power save mode when any STA is not associated with the AP for a predetermined period of time. For example, the AP enters the power save mode when the STA disassociates from the AP or when any STA does not communicate with the AP for the predetermined period of time. The power save mode may also be called a sleep mode.

In the power save mode, the AP may be completely or partially shut down. When the AP is completely shut down, power supply to the AP may be turned off. Conversely, when the AP is partially shut down, power supply to one or more components of the AP may be turned off. In some implementations, when the AP is partially shut down, less than normal power may be supplied to one or more components of the AP.

The power save mode can be easily implemented in the AP when the AP and client stations that communicate with the AP use a network security system to form a secure network. In a secure network, only client stations that are known to and authorized by an AP can access the AP, and the AP ignores communication from unauthorized client stations that are not members of the secure network. For example only, the AP and the client stations may form a secure network using WiFi Protected Setup™ (hereinafter WPS) although any other network security system may be used instead to form the secure network.

When the AP and the client stations use WPS, for example, the AP and the client stations may each comprise a pushbutton that is used to setup the secure network. For example, the pushbuttons on the AP and the client stations may be used to configure security features of the AP and the client stations, respectively. Additionally, the pushbuttons on the AP and the client stations may be used to setup security features of the secure network. For example, a user of a client station can configure the security features using pushbuttons on the AP and the client station.

The pushbutton on the AP that is used for setup can also be used to wake up the AP when a user of a client station of the secure network intends to associate the client station to the AP. Thus, the AP can sleep until the user of the client station that intends to communicate with the AP wakes up the AP by pushing the pushbutton on the AP.

Additionally, the AP knows the client stations that are authorized to associate with the AP. Accordingly, when the AP is awake, the AP can easily determine when any of the authorized client stations do not communicate with the AP for the predetermined period of time. The AP can go to sleep (e.g., enter power save mode) when the predetermined period of time expires. By waking up and staying awake only when client stations communicate with the AP and by sleeping during the rest of the time, the AP can save power.

Figure 4:
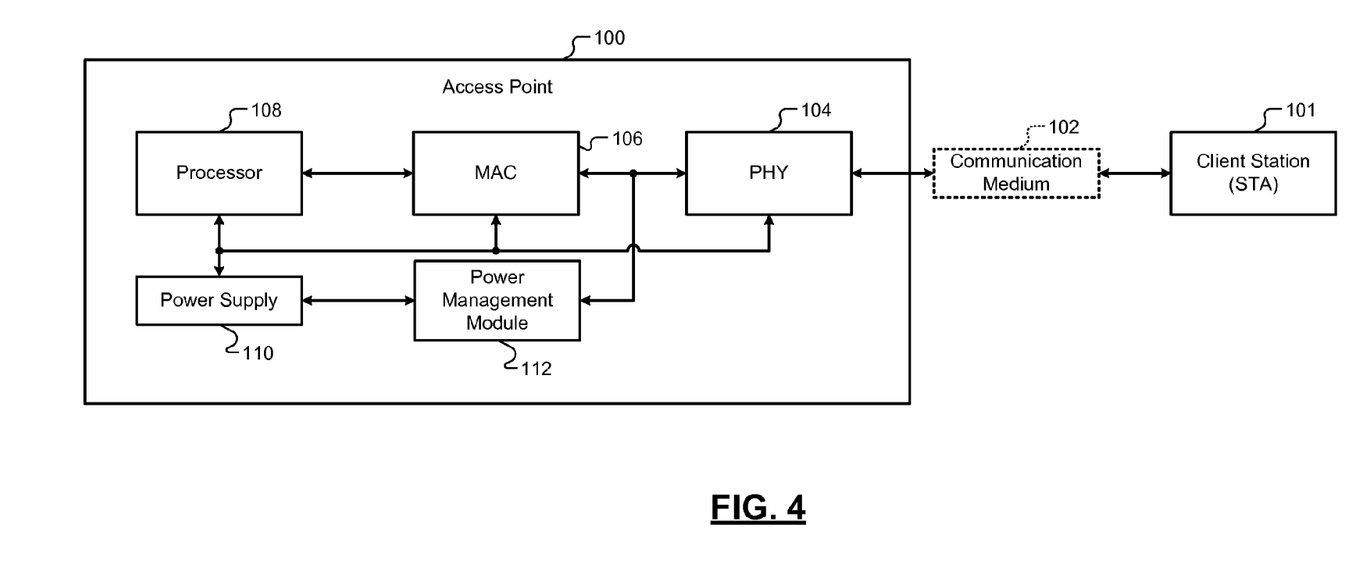
FIG. 4 is a functional block diagram of an exemplary AP having a power save mode according to the present disclosure.

Referring now to FIG. 4, an AP 100 having a power save mode according to the present disclosure is shown. The AP 100 may communicate with other network devices including client stations in a secure network (not shown) via a communication medium 102. For example, the AP 100 may communicate with a client station (hereinafter STA) 101 in the secure network via the communication medium 102. The communication medium 102 may include a wireline or a wireless communication medium.

The AP 100 comprises a physical layer (PHY) 104, a medium access controller (MAC) 106, a processor 108, a power supply 110, and a power management module 112. In some implementations, the power management module 112 or portions thereof may be implemented in one or more of the PHY 104, the MAC 106, and the processor 108.

The PHY 104 interfaces the AP 100 to the communication medium 102. The PHY 104 transmits and receives data via the communication medium 102. The MAC 106 controls access to the communication medium 102. The processor 108 processes the data transmitted and received by the AP 100. The power supply 110 supplies power to the AP 100. The power management module 112 communicates with the PHY 104 (and/or the MAC 106), controls the power supply 110, and determines when the AP 100 enters and exits the power save mode.

Figure 5:
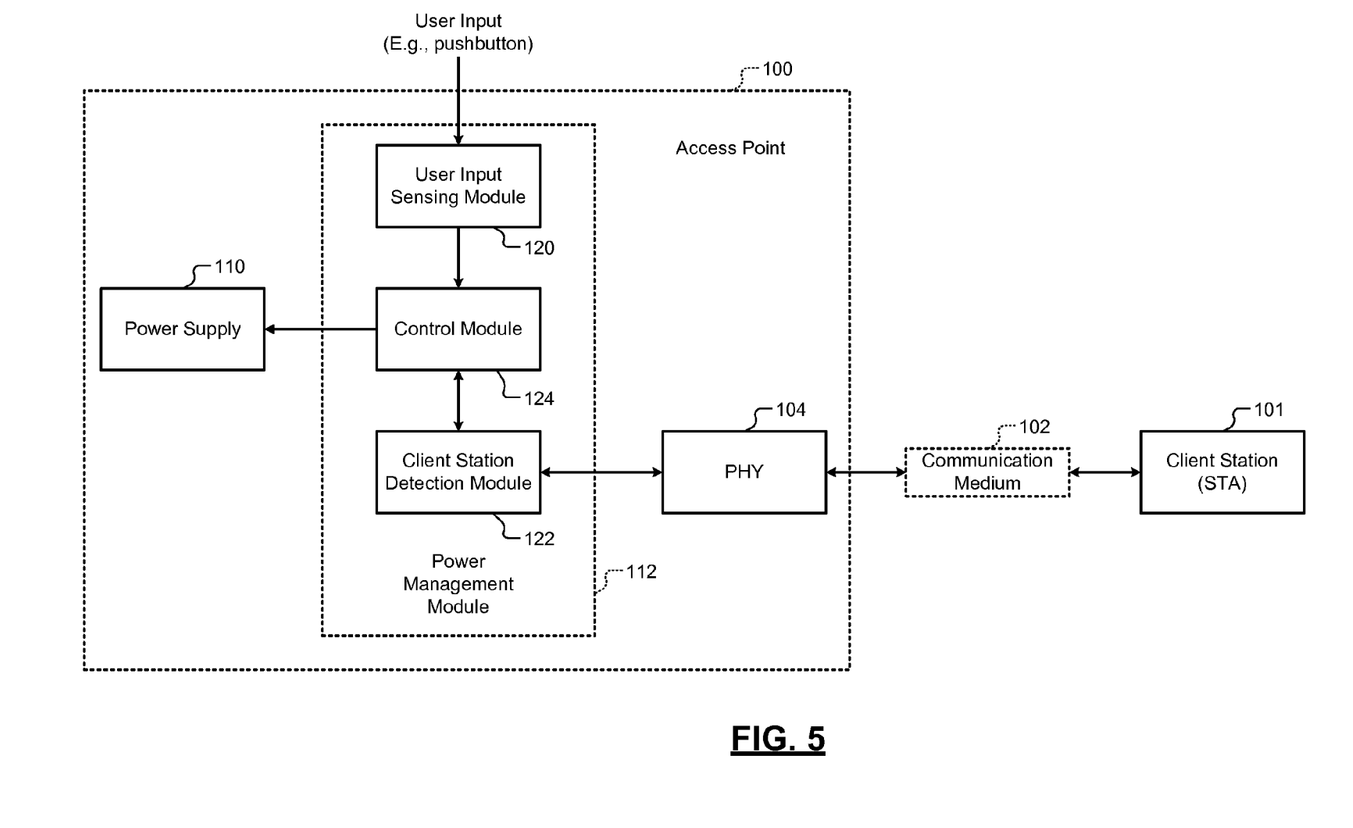
FIG. 5 is a functional block diagram of an exemplary power management module of the AP of FIG. 4.

Referring now to FIG. 5, the power management module 112 comprises a user input sensing module 120, a client station detection module 122, and a control module 124. The user input sensing module 120 senses a user input. The client station detection module 122 monitors communication of client stations in the secure network with the AP 100. The client station detection module 122 detects when a client station of the secure network communicates or does not communicate with the AP 100. The control module 124 controls the power supplied by the power supply 110 to the components of the AP 100 (e.g., the PHY 104, the MAC 106, and the processor 108). The control module 124 determines when the AP 100 enters and exits the power save mode.

Initially, when the AP 100 is in the power save mode, the AP 100 may be completely or partially shut down. In other words, the control module 124 may set the power save mode as the operating mode of the AP 100.

Subsequently, a user of the STA 101 may intend to associate the STA 101 with the AP 100. For example only, the user of the STA 101 may push a pushbutton on the AP 100 when the user intends to associate the STA 101 with the AP 100. The user input sensing module 120 senses when the user pushes the pushbutton on the AP 100. The user input sensing module 120 may output a sensing signal to the control module 124 when the user pushes the pushbutton on the AP 100.

The control module 124 transitions the AP 100 from the power save mode to the normal mode when the control module 124 receives the sensing signal. For example, the control module 124 turns on the power supply 110 to the AP 100 when the control module 124 receives the sensing signal. In some implementations, where the AP 100 is not completely but only partially shut down when a client station is not associated with the AP 100, the control module 124 supplies power to those components of the AP 100 that were partially shut down.

The AP 100 wakes up (i.e., exits the power save mode), enters the normal mode, and begins normal operation. The AP 100 transmits beacons at the predetermined beacon interval. The AP 100 communicates with the STA 101. The AP 100 may receive probe requests from client stations and may transmit probe responses to the client stations that send the probe requests.

The client station detection module 122 monitors communication of client stations with the AP 100. For example, the client station detection module 122 detects when the AP 100 receives a probe request from a client station in the secure network. The client station detection module 122 determines when the STA 101 or any other client station in the secure network disassociates from the AP 100 (e.g., stops communicating with the AP 100). The client station detection module 122 monitors the communication of client stations in the secure network with the AP 100 for the predetermined period of time.

For example only, the client station detection module 122 may include a timer (not shown). The timer may be initialized when the AP wakes up (e.g., when the user pushes the pushbutton on the AP 100). The timer is reset when the client station detection module 122 detects that at least one client station in the secure network communicates with the AP 100 before the predetermined period of time expires.

The timer times out or expires when the client station detection module 122 detects that any client station in the secure network does not communicate with the AP 100 for the predetermined period of time. The client station detection module 122 determines that any client station in the secure network does not communicate with the AP 100 for the predetermined period of time when at least a probe request is not received from at least one client station in the secure network during the predetermined period of time. The client station detection module 122 outputs a timeout signal to the control module 124 when the predetermined period of time expires.

The control module 124 transitions the AP 100 from the normal mode to the power save mode when the control module 124 receives the timeout signal. For example only, the control module 124 may output a power save signal to the power supply 110. The power supply 110 may turn off power to the AP 100 when the power save signal is received. Alternatively, the power supply 110 may turn off power only to some components of the AP 100. In some implementations, the power supply 110 may supply less than normal power to some components of the AP 100. The power supply 110 restores power to the AP 100 or the components of the AP 100 when a user of a client station pushes the pushbutton on the AP 100, and the AP 100 transitions from the power save mode to the normal mode.

Figure 6:
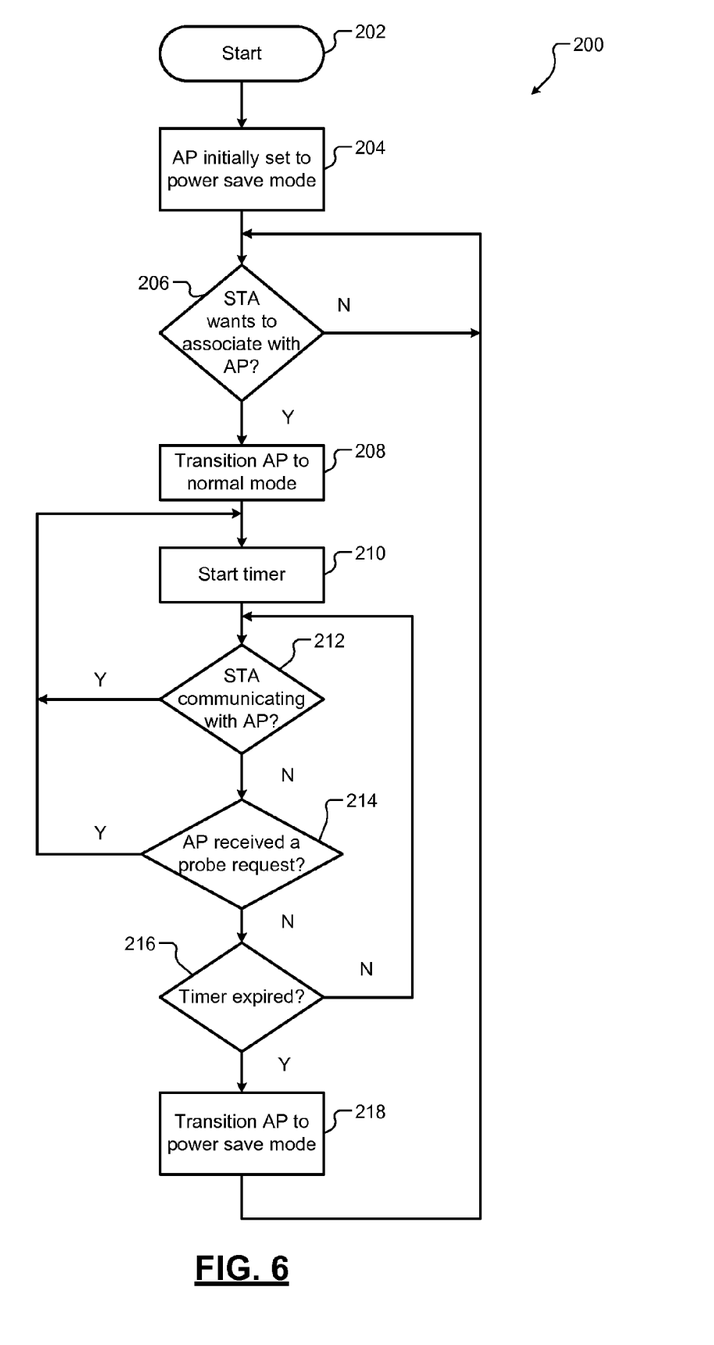
FIG. 6 is a flowchart of an exemplary method for providing the power save mode for the AP of FIG. 4.

Referring now to FIG. 6, a method 200 for providing a power save mode for APs in secure networks according to the present disclosure is shown. Control begins in step 202. In step 204, the operating mode of the AP is initially set to the power save mode. Control determines in step 206 whether a user of a client station in the secure network comprising the AP intends to associate the client station with the AP. Control repeats step 206 when the result of step 206 is false. When the result of step 206 is true, the user of the client station enters an input to the AP (e.g., pushes a pushbutton on the AP) that transitions the AP from the power save mode to the normal mode in step 208.

In step 210, control starts a timer that counts the predetermined period of time. Control determines in step 212 whether the client station (or any other client station) in the secure network is communicating with the AP. Control returns to step 210 and resets the timer in step 210 when the result of step 212 is true. When the result of step 212 is false, control determines in step 214 whether the AP received communication (e.g., a probe request) from at least one client station in the secure network. Control returns to step 210 and resets the timer in step 210 when the result of step 214 is true. When the result of step 214 is false, control determines in step 216 whether the timer expired. Control returns to step 212 when the result of step 216 is false. Control transitions the AP from the normal mode to the power save mode when the result of step 216 is true.

The teachings of the present disclosure are not limited only to APs. The AP is used only as an example in the present disclosure. Other network devices (e.g., STAs and network devices that operate as part-time APs) may implement the teachings.

A part-time AP is a network device that can alternate between operating as an AP and operating as a STA before being fully configured as either an AP or a STA. For example, before the network device begins a process of discovering other network devices, the network device may operate in a low power mode (e.g., the power save mode). Subsequently, the network device may be transitioned from the low power mode to a high power mode (e.g., the normal mode) by initiating an enrollment process based on a user input to the network device.

The enrollment process includes scanning, which is typically performed by a STA, and beaconing, which is typically performed by an AP. Thus, during the enrollment process, the network device functions as a STA (e.g., scans for other network devices) and also as an AP (e.g., transmits beacons).

When the network device discovers a second network device, the network device selects a configuration to operate as an AP or a STA. The selection to operate as an AP or a STA may depend on whether the second network device is an AP or a STA.

For example, when the second network device is a STA, the network device may select a configuration to operate as a STA and may communicate with the second network device in the ad-hoc (peer-to-peer) mode. When the second network device is a STA, the network device may select a configuration to operate as an AP and may communicate with the second network device in the infrastructure mode. When the second device is an AP, the network device may select a configuration to operate as a STA and may communicate with the second network device in the infrastructure mode.

After being configured to operate as an AP or a STA, the network device may transition from the normal mode to the power save mode according to the teachings of the present disclosure. The network device may repeat the above process after power to the network device is cycled.

Figure 7:
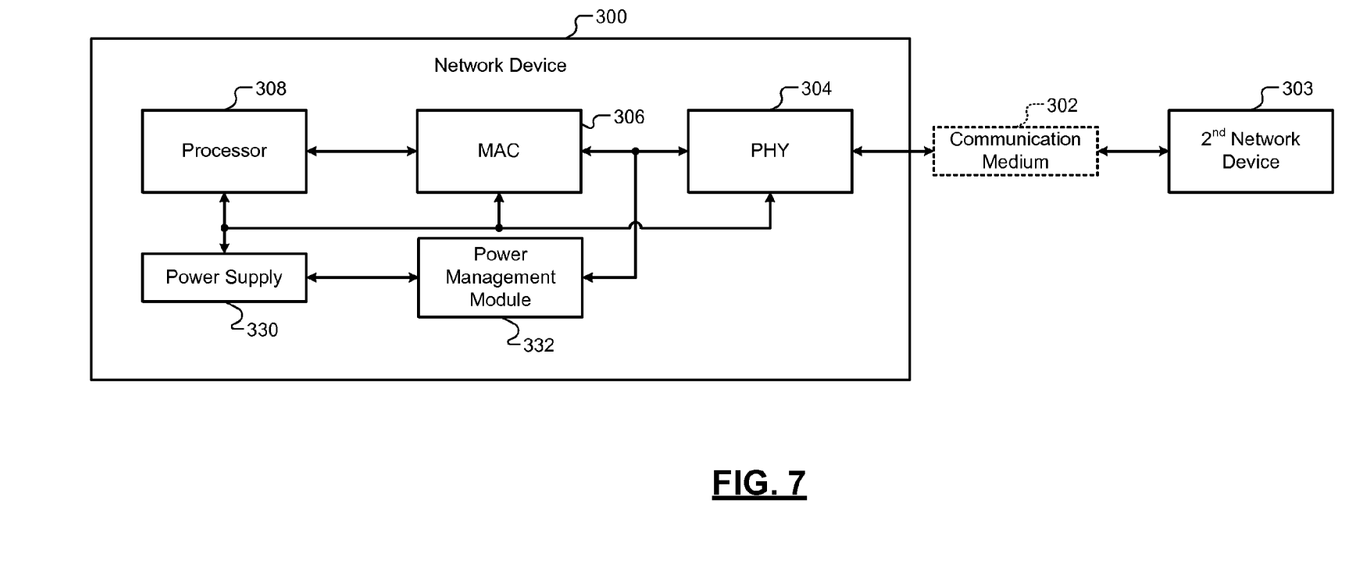
FIG. 7 is a functional block diagram of an exemplary network device according to the present disclosure.

Referring now to FIG. 7, a network device 300 according to the present disclosure is shown. The network device 300 may communicate with other network devices including APs and STAs in a secure network (not shown) via a communication medium 302. For example, the network device 300 may communicate with a second network device 303 in the secure network via the communication medium 302. The communication medium 302 may include a wireline or a wireless communication medium.

The network device 300 comprises a physical layer (PHY) 304, a medium access controller (MAC) 306, a processor 308, a power supply 110, and a power management module 312. In some implementations, the power management module 312 or portions thereof may be implemented in one or more of the PHY 304, the MAC 306, and the processor 308.

The PHY 304 interfaces the network device 300 to the communication medium 302. The PHY 304 transmits and receives data via the communication medium 302. The MAC 306 controls access to the communication medium 302. The processor 308 processes data transmitted and received by the network device 300. The power supply 310 supplies power to the network device 300. The power management module 312 communicates with the PHY 304 (and/or the MAC 306), controls the power supply 310, and determines when the network device 300 enters and exits the power save mode.

Additionally, the power management module 312 operates the network device 300 as an AP and/or as a STA before the network device 300 discovers the second network device 303. After discovery, the power management module 312 configures the network device 300 as an AP or a STA. The power management module 312 controls power supplied to the network device 300 before and after discovery according to the teachings of the present disclosure.

Figure 8:
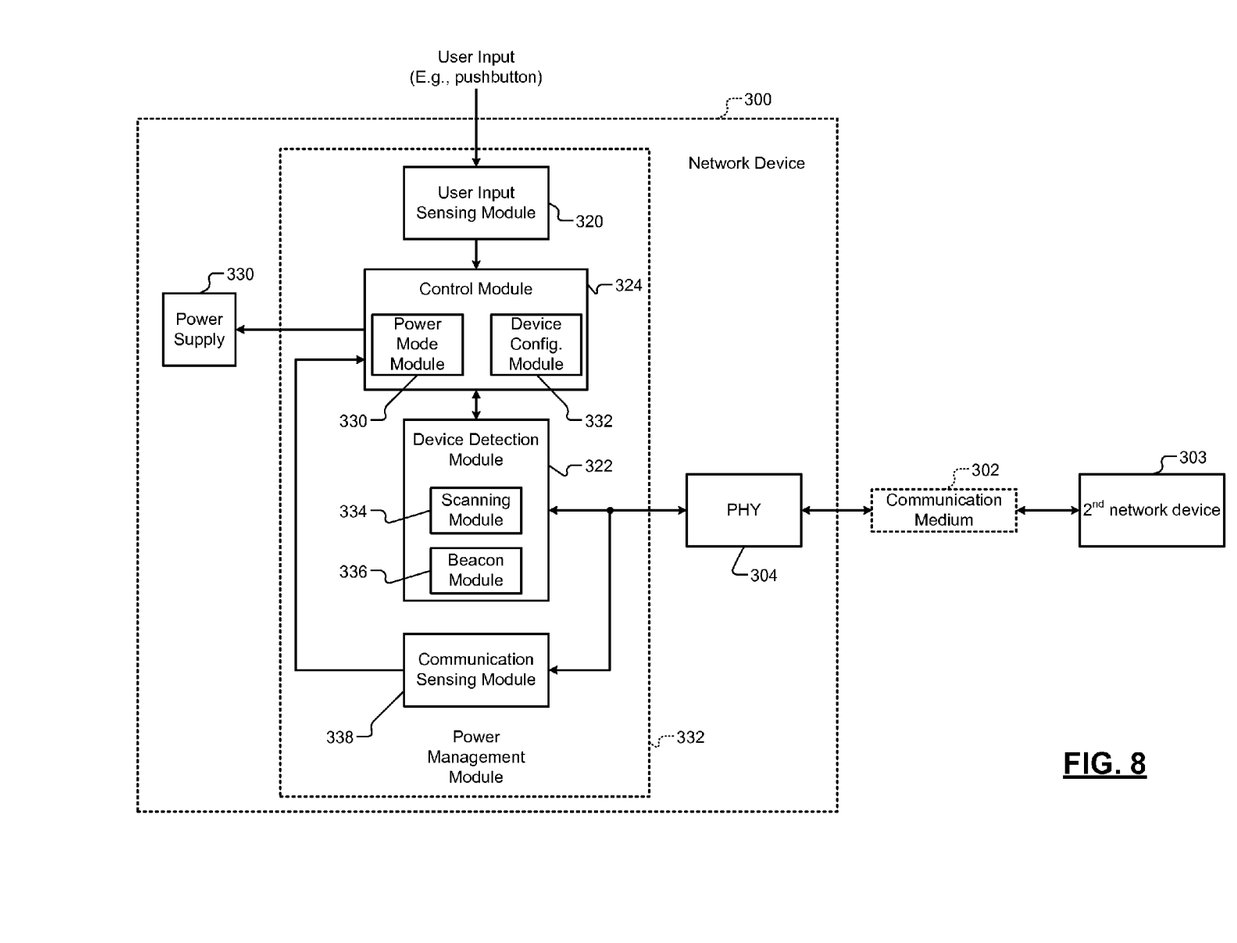
FIG. 8 is a functional block diagram of an exemplary power management module of the network device of FIG. 7.

Referring now to FIG. 8, the power management module 312 comprises a user input sensing module 320, a device detection module 322, a control module 324, and a communication sensing module 338. The user input sensing module 320 is similar to the user input sensing module 120. The control module 324 comprises a power mode module 330 and a device configuration module 332. The power mode module 330 controls whether the network device operates in the power save mode or the normal mode before and after the discovery of the second network device 303. The power mode module 330 transitions the network device 300 from the power save mode to the normal mode and vice versa.

For example, before discovery, the power mode module 330 sets the operating mode of the network device 300 to the power save mode. When a user input is received, the power mode module 330 transitions the network device 300 from the power save mode to the normal mode. After discovery, the power mode module 330 transitions the network device 300 from the normal mode to the power save mode based on whether the network device 300 and the second network device 303 do not communicate for a predetermined time.

The device configuration module 332 configures the network device 300 to operate as an AP and/or a STA. Before discovery, the device configuration module 332 configures the network device 300 to operate as an AP and a STA. The device configuration module 332 configures the network device 300 to alternately operate as an AP and a STA. After discovery, the device configuration module 332 configures the network device 300 to operate as an AP or a STA.

The device detection module 322 detects the second network device 303. The device detection module 322 comprises a scanning module 334 and a beacon module 336. Before discovery, the control module 324 initiates the enrollment process based on user input. The power mode module 330 transitions the network device to the normal mode. The scanning module 334 scans the secure network for other network devices including APs and STAs. Thus, the network device 300 functions as a STA. Additionally, the beacon module 336 transmits beacons. The beacon module 336 may also perform other functions typically performed by an AP. Thus, the network device 300 also functions as an AP. The network device 300 may alternately between functioning as a STA and functioning as an AP.

If no other network device is detected within a predetermined time, the power mode module 330 may transition the network device 300 to the power save mode. When the second network device 303 is detected, the device configuration module 332 fully configures the network device 300 as an AP or a STA. Whether to configure the network device 300 as an AP or a STA may depend on whether the second network device 303 is an AP or a STA. The network device 300 may communicate with the second network device 303 according to the configuration of the network device 300. The configuration of the network device 300 may be changed when power to the network device 300 is cycled.

The communication sensing module 338 senses communication between the network device 300 and the second network device 303. The communication sensing module 338 senses when the network device 300 and the second network device 303 do not communicate for a predetermined period of time. The power mode module 330 transitions the network device 300 to the power save mode when the network device 300 and the second network device 303 do not communicate for a predetermined period of time.

The control module 324 may control the power supplied by the power supply 310 to portions of the network device 300 (e.g., the PHY 304, the MAC 306, and the processor 308). For example, when the network device 300 is in the power save mode, the network device 300 may be completely or partially shut down. Depending on whether the network device 300 is completely or partially shut down, the power supply 110 may turn off power to the network device 300 or portions of the network device 300.

Subsequently, the control module 324 may transition the network device 300 from the power save mode to the normal mode. If the network device 300 was only partially shut down, the control module 324 supplies power to only those portions of the network device 300 that were partially shut down.

Figure 9:
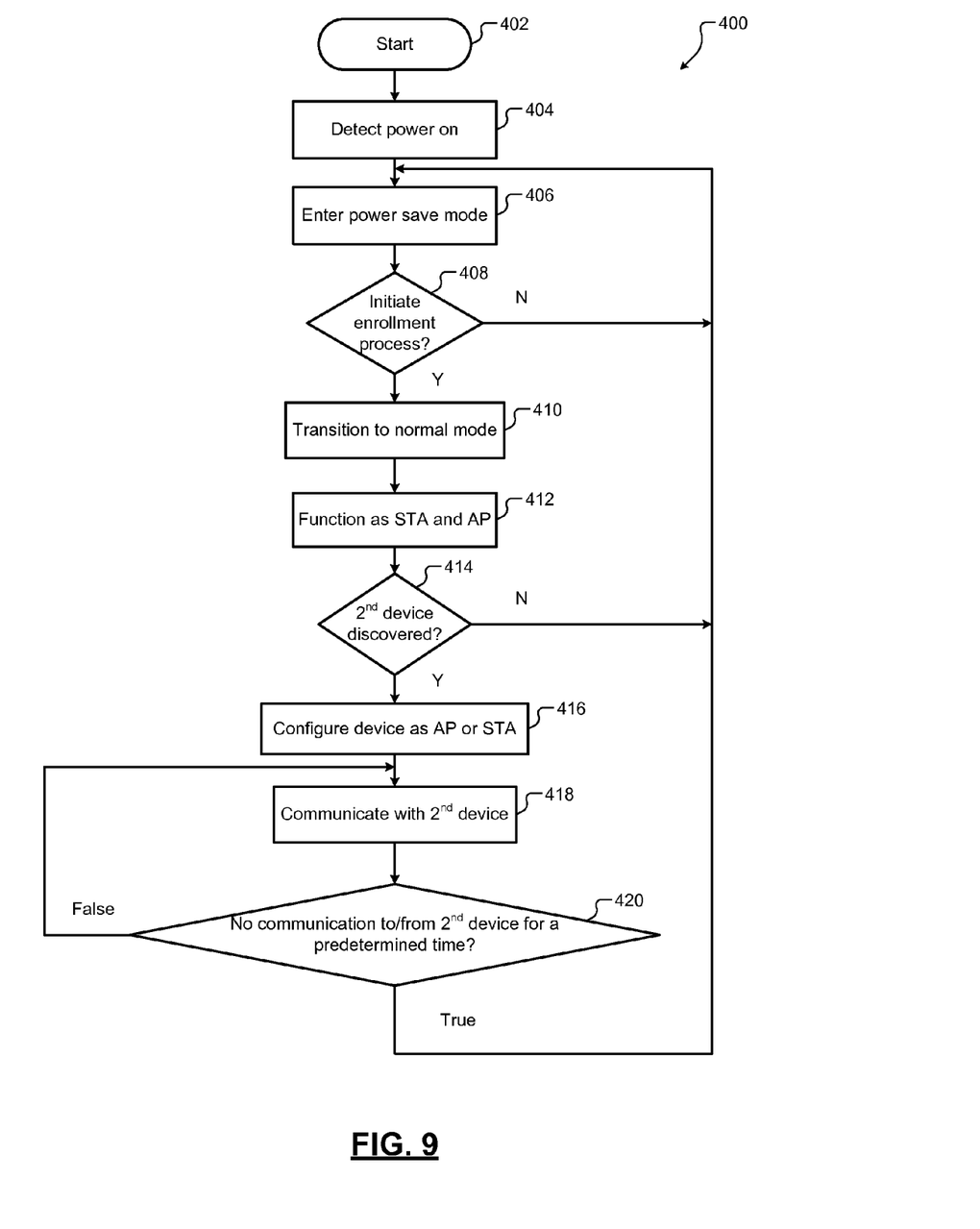
FIG. 9 is a flowchart of an exemplary method for operating the network device of FIG. 7 according to the present disclosure.

Referring now to FIG. 9, a method 400 for operating network devices according to the present disclosure is shown. Control begins in step 402. Control detects in step 404 when power to the network device is turned on. Control sets the operating mode of the network device to the power save mode in step 406. Control determines in step 408 whether to initiate the enrollment process based on user input to the network device. When the result of step 408 is false (e.g., with no user input), control returns to step 406. When the result of step 408 is true, control transitions the network device to the normal mode in step 410.

Control operates the network device as a STA and/or as an AP in step 412. The network device scans other network devices and/or transmits beacons, for example. Control determines in step 414 whether the second network device is discovered within a predetermined time. When the result of step 414 is false, control returns to step 406. When the result of step 414 is true, control configures the network device as an AP or a STA in step 416. Control establishes communication between the network device and the second network device in step 418.

In step 420, control determines whether the network device and the second network device no longer communicate for a predetermined period of time. When the result of step 420 is true, control returns to step 406. When the result of step 420 is false, control returns to step 418.

The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A first network device comprising:
  a control module configured to
   a) operate the first network device, prior to beginning discovery of a second network device, (i) initially in a power save mode and (ii) subsequently in a normal mode in response to receiving an input from a user of the first network device while operating in the power save mode, wherein the first network device (i) performs an operation in the normal mode and (ii) does not perform the operation in the power save mode; and
   b) prior to beginning discovery of the second network device and subsequent to the first network device switching from operating in the power save mode to the normal mode in response to receiving the input from the user of the first network device while operating in the power save mode, alternate between operating the first network device as a client station and an access point; and
  a device detection module configured to begin, subsequent to the first network device switching from operating in the power save mode to the normal mode in response to receiving the input from the user of the first network device while operating in the power save mode, discovery of the second network device by (i) scanning a network in response to the first network device operating as the client station or (ii) transmitting a beacon over the network in response to the first network device operating as the access point.

2. The first network device of claim 1, wherein the control module is configured to select, (i) in response to the device detection module completing discovery of the second network device by detecting the second network device on the network and (ii) based on whether the second network device is a client station or an access point, a configuration to operate the first network device as a client station or an access point.

3. The first network device of claim 2, wherein in response to the second network device being a client station, the control module is configured to (i) operate the first network device as a client station and (ii) communicate with the second network device in an ad-hoc mode.

4. The first network device of claim 2, wherein in response to the second network device being a client station, the control module is configured to (i) operate the first network device as an access point and (ii) communicate with the second network device in an infrastructure mode.

5. The first network device of claim 2, wherein in response to the second network device being an access point, the control module is configured to (i) operate the first network device as a client station and (ii) communicate with the second network device in an infrastructure mode.

6. The first network device of claim 2, wherein subsequent to completing discovery of the second network device, in response to the first network device and the second network device not communicating for a predetermined period of time, the control module is configured to transition the first network device from the normal mode to the power save mode.

7. The first network device of claim 1, wherein subsequent to beginning discovery of the second network device, in response to the second network device being not detected within a predetermined period of time, the control module is configured to transition the first network device from the normal mode to the power save mode.

8. A method comprising:
  operating a first network device, prior to beginning discovery of a second network device, (i) initially in a power save mode and (ii) subsequently in a normal mode in response to receiving an input from a user of the first network device while operating in the power save mode, wherein the first network device (i) performs an operation in the normal mode and (ii) does not perform the operation in the power save mode;
  operating the first network device, (i) prior to beginning discovery of the second network device and (ii) subsequent to the first network device switching from operating in the power save mode to the normal mode in response to receiving the input from the user of the first network device while operating in the power save mode, alternately as a client station and an access point; and
  beginning, subsequent to the first network device switching from operating in the power save mode to the normal mode in response to receiving the input from the user of the first network device while operating in the power save mode, discovery of the second network device by (i) scanning a network in response to the first network device operating as the client station or (ii) transmitting a beacon over the network in response to the first network device operating as the access point.

9. The method of claim 8, further comprising selecting, (i) in response to completing discovery of the second network device by detecting the second network device on the network and (ii) based on whether the second network device is a client station or an access point, a configuration to operate the first network device as a client station or an access point.

10. The method of claim 9, further comprising, in response to the second network device being a client station, (i) operating the first network device as a client station and (ii) communicating with the second network device in an ad-hoc mode.

11. The method of claim 9, further comprising, in response to the second network device being a client station, (i) operating the first network device as an access point and (ii) communicating with the second network device in an infrastructure mode.

12. The method of claim 9, further comprising, in response to the second network device being an access point, (i) operating the first network device as a client station and (ii) communicating with the second network device in an infrastructure mode.

13. The method of claim 9, further comprising transitioning, (i) subsequent to completing discovery of the second network device and (ii) in response to the first network device and the second network device not communicating for a predetermined period of time, the first network device from the normal mode to the power save mode.

14. The method of claim 8, further comprising transitioning, (i) subsequent to beginning discovery of the second network device and (ii) in response to the second network device being not detected within a predetermined period of time, the first network device from the normal mode to the power save mode.

\* \* \* \* \*